US012589040B2

(12) United States Patent
Demehri et al.

(10) Patent No.: US 12,589,040 B2
(45) Date of Patent: Mar. 31, 2026

(54) PATIENT POSITIONING

(71) Applicant: Children's Medical Center Corporation, Boston, MA (US)

(72) Inventors: Farokh R. Demehri, Brookline, MA (US); Heung Bae Kim, Weston, MA (US); Brianna L. Slatnick, Cambridge, MA (US); Robert W. Crum, Brookline, MA (US); Kyle C. Wu, Boston, MA (US); Alexander Yang, Boston, MA (US); Steven J. Fishman, Weston, MA (US)

(73) Assignee: The Children's Medical Center Corporation, Boston, MA (US)

( * ) Notice: Subject to any disclaimer, the term of this patent is extended or adjusted under 35 U.S.C. 154(b) by 44 days.

(21) Appl. No.: 18/772,011

(22) Filed: Jul. 12, 2024

(65) Prior Publication Data

US 2024/0366445 A1 Nov. 7, 2024

Related U.S. Application Data

(63) Continuation of application No. 17/964,175, filed on Oct. 12, 2022, now Pat. No. 12,070,429, which is a continuation of application No. PCT/US2021/027091, filed on Apr. 13, 2021.

(60) Provisional application No. 63/034,685, filed on Jun. 4, 2020, provisional application No. 63/009,258, filed on Apr. 13, 2020.

(51) Int. Cl.
*A61G 7/00* (2006.01)
*A61G 7/05* (2006.01)

(52) U.S. Cl.
CPC ............... *A61G 7/001* (2013.01); *A61G 7/05* (2013.01); *A61G 2200/325* (2013.01)

(58) Field of Classification Search
None
See application file for complete search history.

(56) References Cited

U.S. PATENT DOCUMENTS

| | | | |
|---|---|---|---|
| 3,302,218 | A | 2/1967 | Stryker |
| 4,244,358 | A | 1/1981 | Pyers |
| 4,607,403 | A | 8/1986 | Alivizatos |

(Continued)

FOREIGN PATENT DOCUMENTS

| | | |
|---|---|---|
| CA | 2229686 | 12/2008 |
| EP | 0877590 | 4/2003 |
| WO | WO-2021211590 | 10/2021 |

OTHER PUBLICATIONS

Arjo, , "RotoProne Therapy System instructions for use", NPL-34 Apr. 2019 , 84 pages.

(Continued)

*Primary Examiner* — Adam C Ortiz
(74) *Attorney, Agent, or Firm* — Strategic Patents, P.C.

(57) ABSTRACT

A proning device includes a conformable structure that adapts to the shape of a subject, surrounded by a shell that imparts a substantially elliptical or circular cross-sectional shape to an exterior of the device to facilitate rotation of the subject within the device when the device is wrapped around the subject. A low-friction interface may also be provided to further facilitate rotation of the subject. The device advantageously reduces staffing needs for proning a subject while facilitating extended proning and periodic re-orientation of the subject. Also disclosed herein are methods for making and using such a proning device.

20 Claims, 14 Drawing Sheets

(56) References Cited

U.S. PATENT DOCUMENTS

| | | | |
|---|---|---|---|
| 4,939,801 | A | 7/1990 | Schaal et al. |
| 5,065,464 | A | 11/1991 | Blanchard et al. |
| 6,073,291 | A | 6/2000 | Davis |
| 6,691,347 | B2 | 2/2004 | Hand et al. |
| 6,898,809 | B2 | 5/2005 | Davis |
| 6,966,081 | B1 | 11/2005 | Sharps et al. |
| 7,373,680 | B2 | 5/2008 | Davis |
| 7,712,170 | B2 | 5/2010 | Davis |
| 8,555,440 | B2 | 10/2013 | Lewis |
| 8,566,977 | B2 | 10/2013 | Davis |
| 2002/0026671 | A1 | 3/2002 | Hand et al. |
| 2007/0174966 | A1 | 8/2007 | Lopez-sansalvador |
| 2012/0246831 | A1 | 10/2012 | Paillusseau |
| 2017/0135879 | A1 | 5/2017 | Reiners et al. |
| 2017/0151112 | A1 | 6/2017 | Fletcher et al. |
| 2019/0231624 | A1 | 8/2019 | Lafleche et al. |
| 2023/0036914 | A1 | 2/2023 | Demehri et al. |

OTHER PUBLICATIONS

WVU Medicine, , "Vollman Prone Positioner Instructions", https://wvumedicine.org/criticalcare/sicu-vollman-prone-positioner/ NPL-35 2019 , 1 Page.

Hovertech International, , "HoverMatt", Lloyd, JD, Biomechanical Evaluation of Pressure Distribution During Extended Use of HoverMatt® Technology. https://hovermatt.com/wp-content/uploads/2019/12/Bro_HM_0816.pdf NPL—Oct. 13, 26, 2010 , 6 Pages.

Wiggermann, Neal et al., "Proning Patients With COVID-19: A Review of Equipment and Methods", Human Factors, vol. 62, No. 7 NPL—Nov. 14, 2020 , pp. 1069-1076.

Arjo, , "Rotoprone", https://www.arjo.com/en-us/products/medical-beds/critical-care/rotoprone/ NPL—Apr. 24, 2020 , 3 pages.

Cramer Decker Medical, , "Bags and Cases", http://www.cramerdeckermedical.com/category.php?category_id=1 NPL-25 Apr. 5, 2020 , 1 Pages.

Mount Sinai Health System, , "Prone Positioning for the COVID-19 Patient", https://www.youtube.com/watch?v=ECdxhNFLwVo NPL-26 Mar. 31, 2020 , 1 Pages.

USPTO, , "U.S. Appl. No. 17/964,175 Notice of Allowance mailed Apr. 17, 2024", , 14 pages.

EPO, , "EP Application No. 21789394.0 Extended Search Report mailed Mar. 15, 2024", , 8 pages.

ISA/US, , "PCT Application No. PCT/US/21/27091 International Search Report and Written Opinion mailed Aug. 2, 2021", NPL-27 , 10 pages.

WIPO, , "PCT Application No. PCT/US21/27091 International Preliminary Report on Patentability mailed Oct. 27, 2022", , 8 pages.

PATIENT POSITIONING

CROSS-REFERENCE TO RELATED APPLICATIONS

This application is a continuation of U.S. patent application Ser. No. 17/964,175 filed on Oct. 12, 2022, which is a bypass continuation that claims priority to International Patent Application No. PCT/US21/27091 filed on Apr. 13, 2021, which claims priority to U.S. Provisional Patent App. No. 63/034,685 filed on Jun. 4, 2020, and U.S. Provisional Patent App. No. 63/009,258 filed on Apr. 13, 2020. The entire content of each of these applications is hereby incorporated by reference.

TECHNICAL FIELD

The disclosure generally relates to patient positioning and, more particularly, to proning for patients under pulmonary distress.

BACKGROUND

Proning an intubated or otherwise immobilized patient may be useful in reducing patient morbidity resulting from pulmonary disease such as acute respiratory distress syndrome (ARDS) or the progression of pulmonary distress associated with COVID-19. While proning immobilized patients may be beneficial, the process can involve substantial effort. For example, proning an intubated, immobile patient may require 4-6 trained staff members using a combination of pillows and sheets in order to move the patient while avoiding injury or interfering with medical devices such as ventilators. In a crowded or busy medical facility, it can be a logistical challenge to simply find a sufficient number of available staff members.

There remains a need for proning techniques that are safe and effective, while decreasing staffing requirements.

SUMMARY

A proning device includes a conformable structure that adapts to the shape of a subject, surrounded by a shell that imparts a substantially elliptical cross-sectional shape to an exterior of the device to facilitate rotation of the subject within the device when the device is wrapped around the subject. A low-friction interface may also be provided to further facilitate rotation of the subject. The device advantageously reduces staffing needs for proning a subject while facilitating extended proning and periodic re-orientation of the subject. Also disclosed herein are methods for making and using such a proning device.

In one aspect, a patient proning device disclosed herein may include: an interior formed of a conformable structure shaped and sized to enclose a front and back of a human body while exposing at least a head of the human body along an axis of the device aligned to the human body when the human body is placed within the interior, the conformable structure including a viscoelastic foam selected to support and conform to the human body on a bottom surface of the human body, and the interior formed of at least two radial segments in a clam-shell arrangement separable about the axis to permit the human body to be removably and replaceably inserted into and removed from within the interior; a shell coupled to the interior, the shell including a continuous sheet of a flexible material securable about the interior along at least a portion of the axis and operable to impart a substantially elliptical cross section to the device along the axis when secured about the interior; a bedding surface for the shell, the bedding surface including raised edges to resist translation of the shell relative to the bedding surface during rotation of the shell; and a low-friction interface between an exterior surface of the shell and the bedding surface, the low-friction interface including a closed loop of deformable sheet material disposed between the shell and a bedding surface, the closed loop of deformable sheet material having an interior surface with a self-coefficient of friction for internal contact and an exterior surface having a coefficient of friction with the shell and the bedding surface greater than the self-coefficient of friction for the interior surface.

In one aspect, a device disclosed herein may include: an interior formed of a conformable structure shaped and sized to enclose a front and back of a human body while exposing at least a head of the human body along an axis of the device aligned to the human body when the human body is placed within the interior, the conformable structure formed of a material selected to support and conform to the human body on a bottom surface of the human body, and the interior formed of at least two radial segments separable about the axis to permit the human body to be removably and replaceably inserted into and removed from within the interior; a shell coupled to the interior, the shell securable around the axis of the device and the shell operable to impart a substantially elliptical cross section to the device along the axis when secured about the interior; and a low-friction interface below an exterior surface of the shell, the low-friction interface configured to facilitate rotation of the device about the axis without lateral movement of the device when the human body is placed within the interior and the shell is secured around the interior.

Implementations may include one or more of the following features. The conformable structure may include resilient flowable pellets. The conformable structure may include a bag filled with expandable polystyrene foam pellets. The conformable structure may include a viscoelastic foam. The conformable structure may include one or more removable and replaceable pads. The conformable structure may include one or more inflatable chambers. The device may further include a pressurized fluid source coupled to the one or more inflatable chambers and operable to controllably inflate the one or more inflatable chambers. The shell may include one or more non-stretchable panels on an exterior surface of the one or more inflatable chambers. The shell may include a continuous sheet of a flexible material securable about the interior to apply a radial tension about the interior that deforms an exterior surface of the conformable structure into a substantially cylindrical shape. The shell may include a polymer sheet. The shell may include one or more inflatable chambers pressurizable to impart the substantially elliptical cross section to the device. The device may further include a pressurized fluid source coupled to the one or more inflatable chambers and operable to controllably inflate the one or more inflatable chambers. The shell may include a plurality of cushions arranged about the conformable structure and shaped to impart the substantially elliptical cross section to the device. The device may further include a pressurized air source, where the low-friction interface includes an air cushion between the shell and a bedding surface generated by the pressurized air source. The low-friction interface may include a closed loop of deformable sheet material disposed between the shell and a bedding surface, the closed loop of deformable sheet material having an interior surface with a self-coefficient of friction for internal contact and an exterior surface having a coefficient of friction with the shell greater than the self-coefficient of friction for the interior surface. The low-friction interface may include a material on a bedding surface selected for a low coefficient of friction with an exterior surface of the shell. The shell may include one or more tensioning belts configured to apply radial tension about the interior. The device may further include a plurality of restraints arranged to secure the human body within the conformable structure of the interior of the device. The device may further include a plurality of pull elements arranged about an exterior of the shell, the plurality of pull elements shaped, sized, and positioned to facilitate rotation of the device about the axis. The device may further include a bedding surface beneath the low-friction interface, the bedding surface including raised edges positioned to retain the device within the bedding surface during a rotation of the device on the low-friction interface about the axis.

BRIEF DESCRIPTION OF THE DRAWINGS

The foregoing and other objects, features and advantages of the devices, systems, and methods described herein will be apparent from the following description of particular embodiments thereof, as shown in the accompanying figures. The figures are not necessarily to scale, emphasis instead being placed upon describing the principles of the devices, systems, and methods disclosed herein.

Like reference symbols in the various drawings indicate like elements.

DETAILED DESCRIPTION

Figure 1:
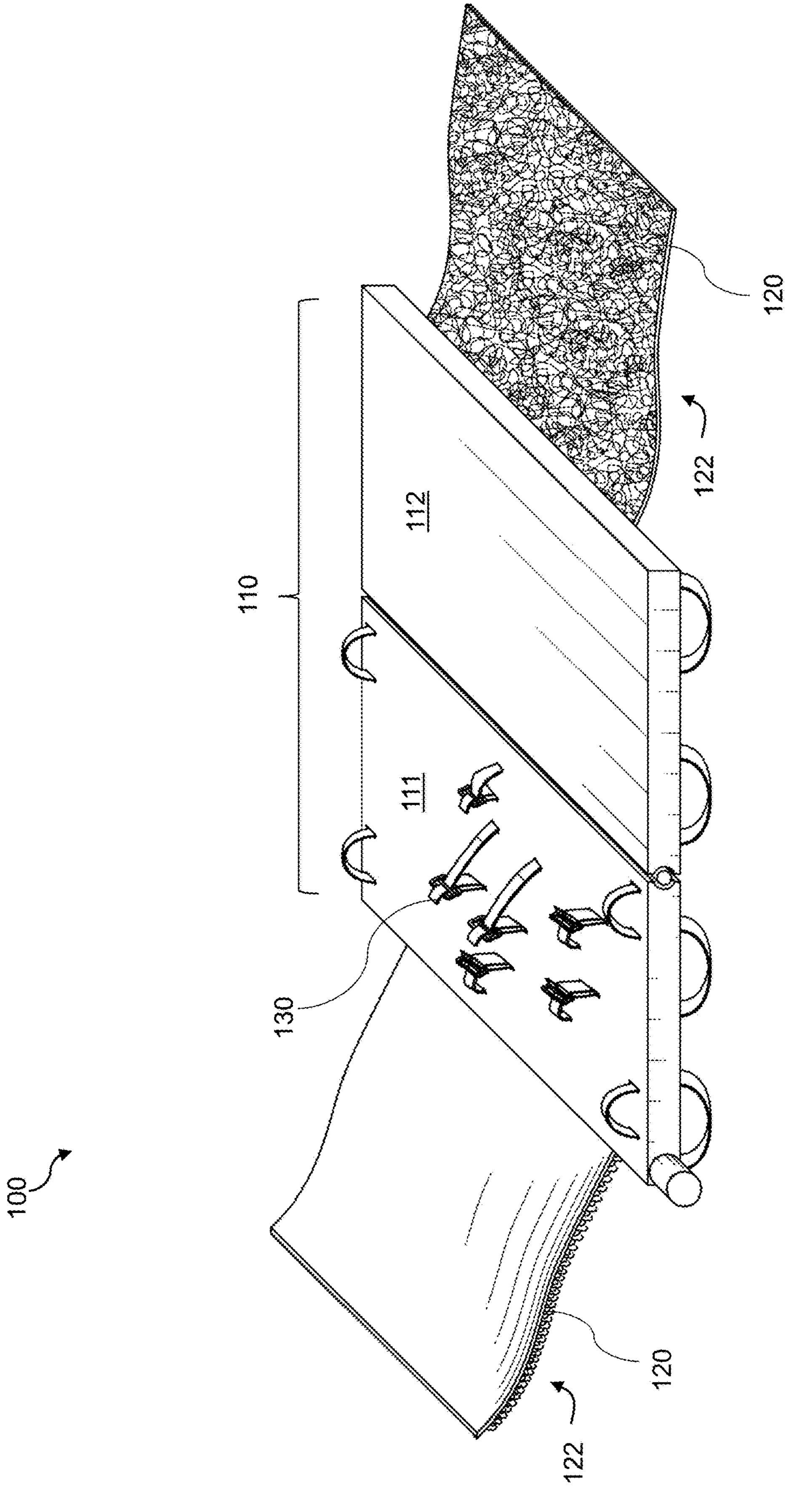
FIG. 1 is a schematic representation of a proning device.

The embodiments will now be described more fully hereinafter with reference to the accompanying figures, in which certain embodiments are shown. The foregoing may, however, be embodied in many different forms and should not be construed as limited to the embodiments shown herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, unless otherwise indicated or made clear from the context, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended to better describe the embodiments and does not pose a limitation on the scope of the embodiments or the claims. No language in the specification should be construed as indicating any unclaimed element as essential to the practice of the disclosed embodiments.

In the following description, it is understood that terms such as "first," "second," and the like, are words of convenience and are not to be construed as limiting terms, unless specifically stated.

As used herein, the term "clinician" shall be generally understood to refer to a care provider interacting with any portion of the devices and/or systems described herein in the course of preparing for or carrying out any one or more of the methods described herein for proning a subject. Thus, for example, the term clinician is intended to include a physician, a nurse, a medical technician, a paramedic, or any other medical professionals or paraprofessionals. Further, the term clinician may include support personnel assisting a medical professional in preparing for or carrying out a medical procedure.

Also, as used herein, the term "subject" shall be generally understood to be a mammal. Thus, the term subject shall be understood to include humans, as well as any other mammals treatable according to the techniques described herein. Stated differently, unless otherwise specified or made clear from the context, the devices, systems, and methods of the present disclosure shall be understood to be applicable to medical treatment of humans, veterinary treatment of other mammals, or teaching/research environments using mammals.

Further, as used herein, the term "proning" shall be understood to include any rotation of a subject about a longitudinal axis defined by the subject. Thus, for example, proning shall be understood to include any degree of rotation of a subject from a supine position toward a prone position and, further or instead, shall be understood to include any degree of rotation of a subject from a prone position to a supine position.

FIG. 1 shows a proning device 100. As generally described herein, the proning device 100 may include a shell 120 enclosing a conformable structure 110 having a first surface 111 and a second surface 112 opposite the first surface 111. The shell 120 may be wrappable around a portion of a largest circumference of a subject positioned on the first surface 111. The device 100 may also include one or more fasteners 122 as described herein that are releasably securable to hold the shell 120 in a wrapped position in which the fastener(s), the shell 120, and the conformable structure 110 collectively circumscribe the largest circumference of the subject. The fasteners 122 may be formed, e.g., by mating hook and loop surfaces on the shell 120, or by straps, tensioning loops, or the like, placed around the shell 120 after enclosing the subject. The proning device 100 may include a plurality of restraints 130, each restraint 130 securable about the subject positioned on the first surface 111, and each restraint 130 releasable from the subject along each of the first surface 111 and the second surface 112 of the conformable structure 110, and/or from an exterior surface (e.g., while enclosing a subject) or an interior surface (e.g., while the subject is not wrapped) of the conformable structure 110.

Figure 2:
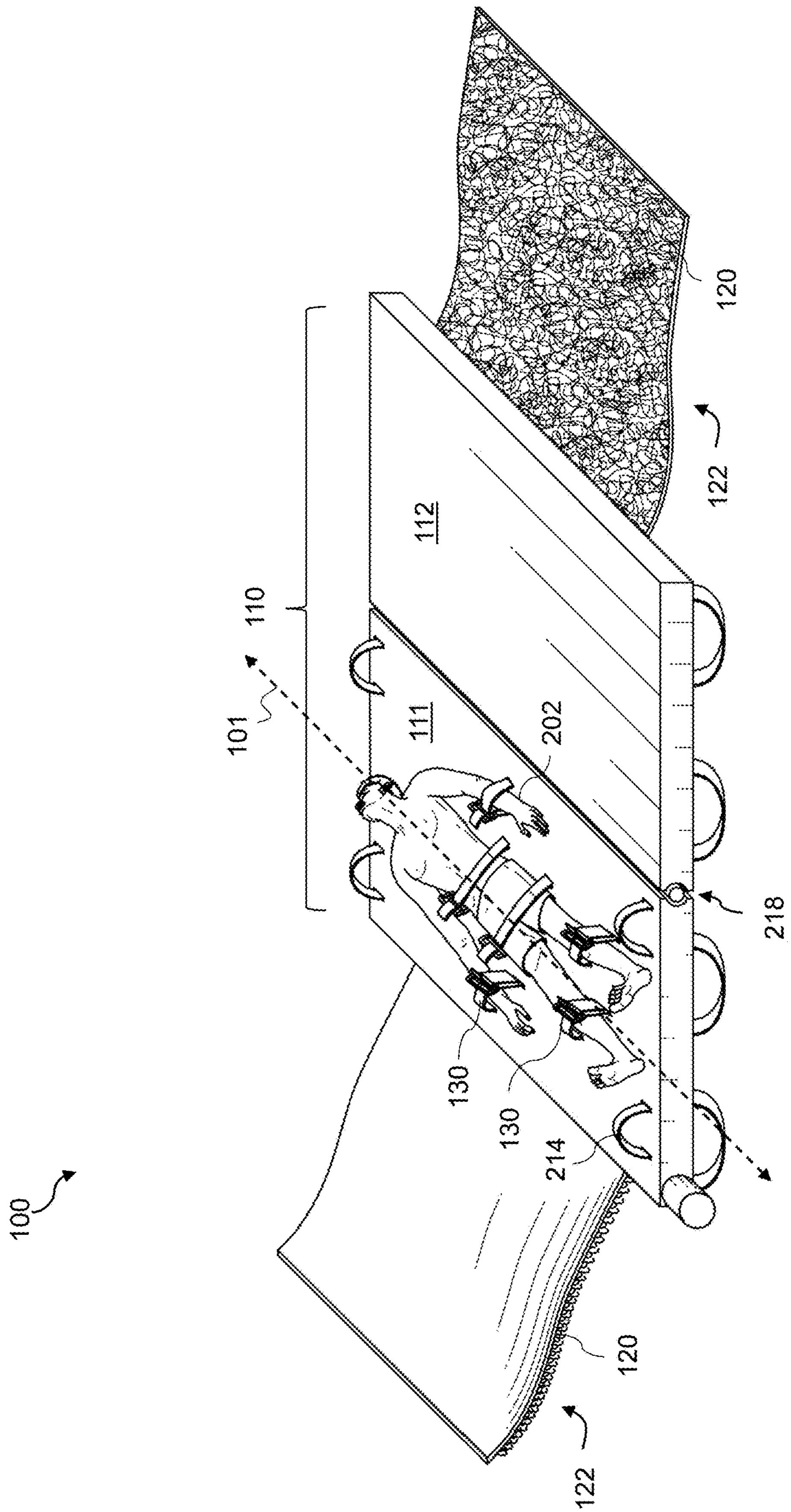
FIG. 2 is a schematic representation of a subject in a supine position on a first surface of the proning device of FIG. 1.
Figure 5:
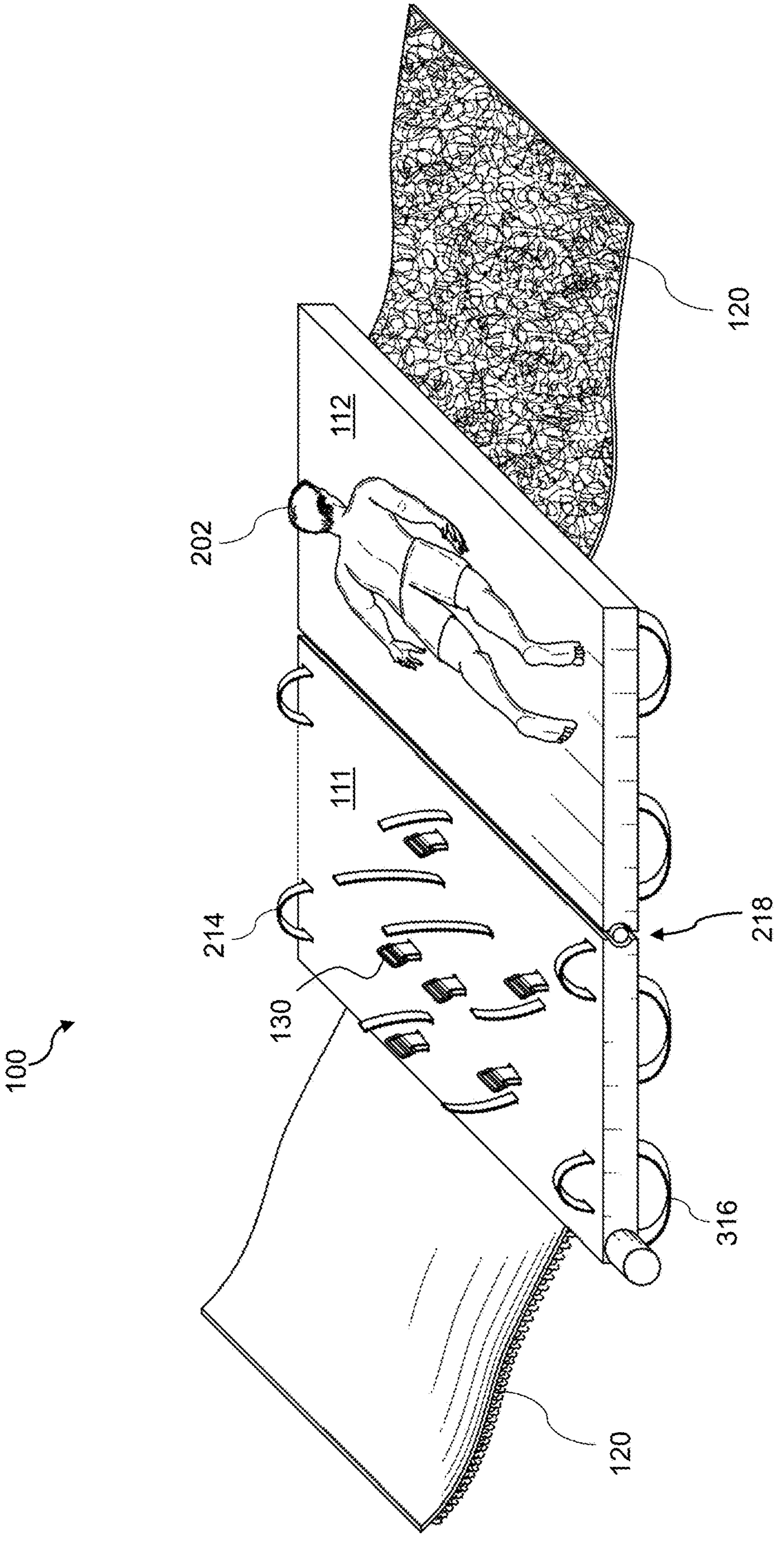
FIG. 5 is a schematic representation of the subject in a prone position following release of restraints and the fastener and unwrapping a portion of the shell of the proning device from the position shown in FIG. 4.
Figure 6A:
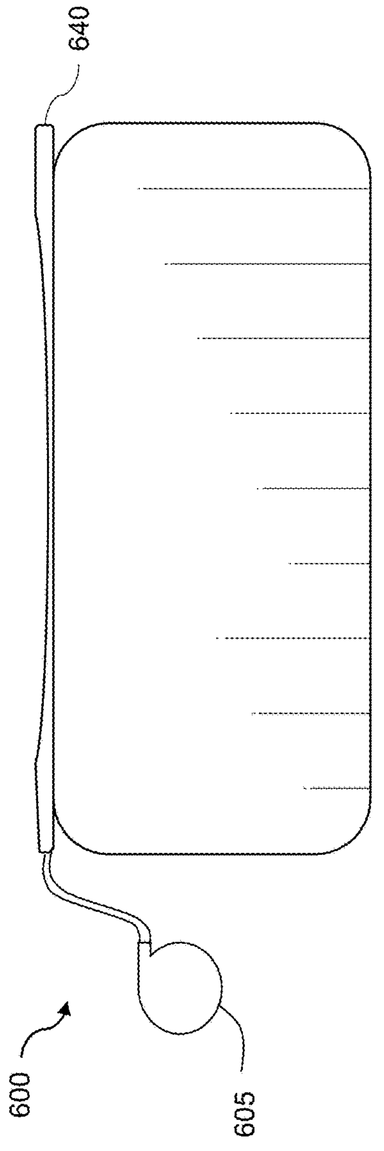
FIG. 6A is a schematic representation of a side view of a bedding surface of a proning device supported on a bed, the bedding surface shown in an uninflated state.
Figure 6B:
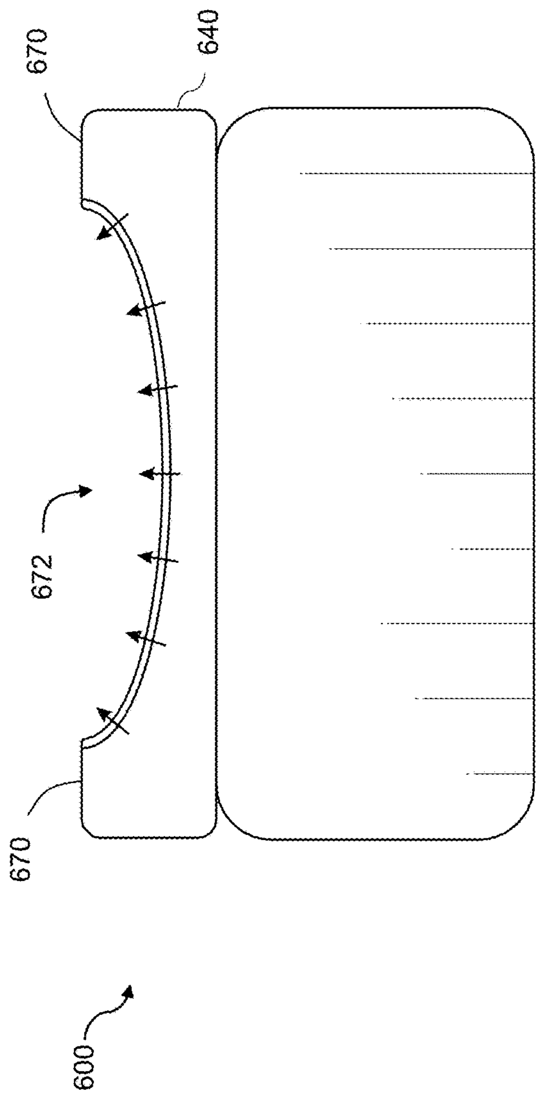
FIG. 6B is a schematic representation of a side view of a bedding surface of the proning device of FIG. 6A on a bed, the bedding surface shown in an inflated state.
Figure 6D:
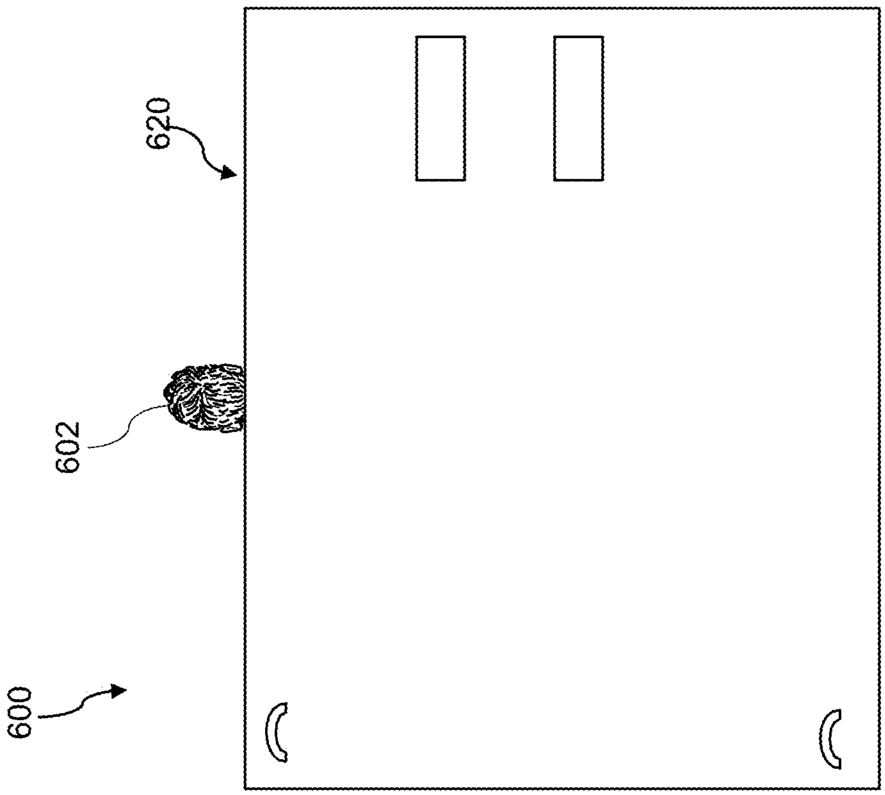
FIG. 6D is schematic representation of a bottom view of the shell of FIG. 6C, with the first surface of the shell opposite a second surface of the shell, and the first surface of the shell positioned along the subject.
Figure 6C:
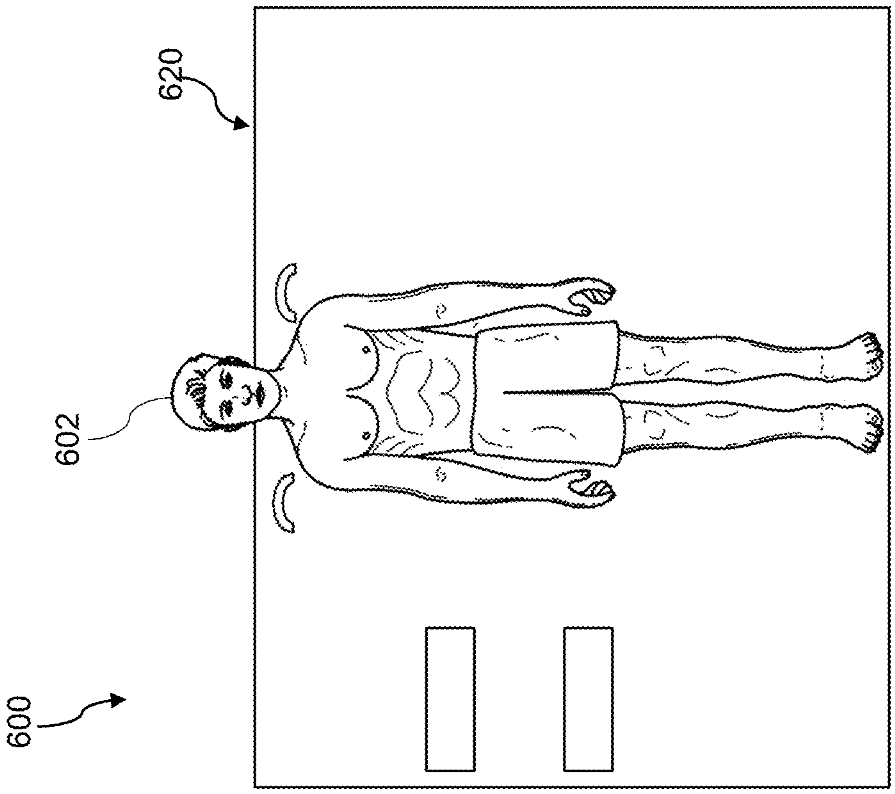
FIG. 6C is schematic representation of a top view of a shell of a proning device, with a first surface of the shell positioned along a subject.
Figure 6E:
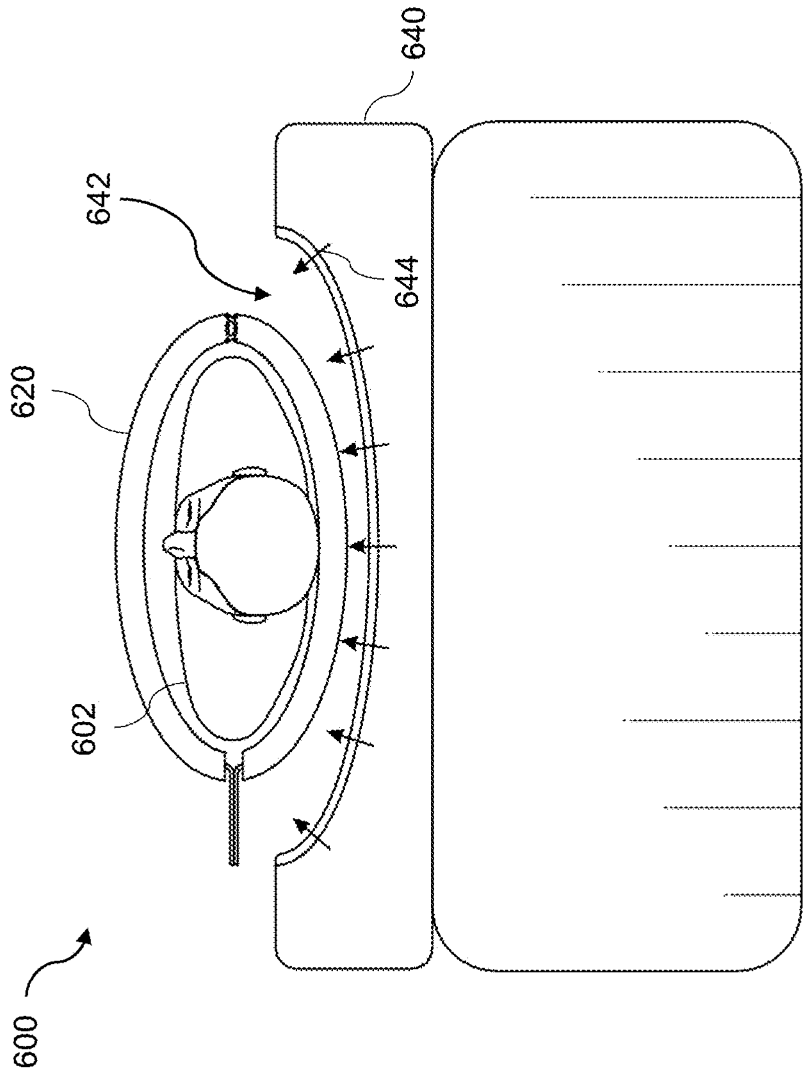
FIG. 6E is a schematic representation of a side view of the proning device including the bedding surface of FIG. 6B and the shell of FIG. 6C, with the bedding surface shown in the inflated state and the shell wrapped about the subject with the first surface along the subject and the second surface facing away from the subject and toward a low-friction interface of the bedding surface.

Referring now to FIGS. 1 and 2, a proning device 100 may include a shell 120 and a plurality of restraints 130. The shell 120 may include or enclose a conformable structure 110 having a first surface 111 and a second surface 112 opposite the first surface 111. The shell 120 may be wrappable around a portion (e.g., a largest circumference) of a subject 202 positioned on the first surface 111. The shell 120 may be releasably securable to hold the conformable structure 110 in a wrapped position in which the shell 120 and the conformable structure 110 collectively circumscribe a circumference (e.g., the largest circumference) of the subject 202. Each restraint 130 may be securable about the subject 202, e.g., at a wrist, ankle, arm, torso, and so forth, when positioned on the first surface 111 of the conformable structure 110. Additionally, or alternatively, each restraint 130 may be releasable from the subject 202 along each of the first surface 111 and the second surface 112 of the conformable structure 110. That is each restraint 130 may be secured while the subject 202 lies on the first surface 111 before proning (as shown in FIG. 2), and may also or instead be released while the subject 202 lies on the second surface after proning (as shown in FIG. 5). In general, the operation of the restraints 130 from both sides of the conformable structure 110 facilitates wrapping, rotation, and unwrapping of the subject 202 for movement between proned and supine positions. For example, as compared to proning a subject 202 using a combination of sheets and pillows, the accessibility of the restraints 130 from both the first surface 111 and the second surface 112 may facilitate safely proning the subject 202 using a wrapping technique that requires fewer staff resources.

In general, the conformable structure 110 in an interior of the proning device 100 may be shaped and sized to enclose a front and back of a human body, while exposing at least the head of the human body along an axis 101 of the device aligned to the human body when the human body is placed within the interior for use of the device 100. The conformable structure 110 may be formed in whole or in part from a material (or combination of materials) selected to support and conform to the human body on a bottom surface of the human body, e.g., the surface of the body in contact with the first surface 111 of the conformable structure 110 as illustrated in FIG. 2. The interior of the proning device 100, as formed by the first surface 111 and the second surface 112 of the conformable structure 110 when closed around the human body 202, may include at least two radial segments such as the first surface 111 and the second surface 112 that are separable about the axis 101 to permit the subject 202 to be removably and replaceably inserted into and removed from within the interior, as described in greater detail herein.

The shell 120 may be coupled to the interior, e.g., the conformable structure 110, and may be securable about the interior along a portion of the axis 101. The shell 120 may be generally operable to impart a substantially elliptical cross section to the device along the axis 101 when secured about the interior as illustrated, for example, in FIGS. 3 and 4. In one aspect, the shell 120 may include one or more non-stretchable panels on an exterior surface of one or more inflatable chambers (e.g., of the conformable structure 110)

that tend to impart an elliptical cross section to an exterior of the proning device 100. The shell 120 may also or instead include a continuous sheet of a flexible material or one or more tensioning belts or the like (or some combination of these) securable about the interior to apply a radial tension about the interior that deforms an exterior surface of the conformable structure into a substantially cylindrical shape. The shell 120 may, for example, include a polymer sheet or other pliable but substantially non-stretchable sheet material. In this context, substantially non-stretchable means sufficiently resistant to in-plane elastic deformation to permit the shell 120 to radially tension the conformable structure 110 of the proning device 100 into a substantially elliptical cross section for proning as described herein. In another aspect, the shell 120 may include a plurality of cushions forming or arranged about the conformable structure 110 and shaped to impart the substantially elliptical cross section to the device.

FIGS. 2-5 illustrate a sequence of steps for proning a subject 202 using the proning device 100. While the sequence illustrates movement from a supine position to a prone position, it should be appreciated that the sequence may be reversed to rotate the subject 202 from a prone position to a supine position. In this latter technique, the patient may begin prone on the first surface 111 that includes the restraints 130. Additionally, while rotation of the subject 202 is described as being approximately 180-degrees, it should be appreciated that the proning device 100 may be used to carry out any of various different degrees of rotation about a longitudinal axis 101 of the subject 202, unless otherwise specified or made clear from the context.

Referring now to FIG. 2, the subject 202 may be placed on the first surface 111 of the conformable structure 110 in a supine position. Tubes, cords, or other elongate components of medical devices connected to the subject 202 may be secured in one or more guide loops 214 to reduce the likelihood of entanglement and, more generally, to reduce the likelihood of interfering with medical treatment of the subject 202 as the subject 202 is rotated. The guide loops 214 may be permanently secured to the first surface 111, or may be removably and replaceably secured, e.g., with Velcro, buckles, buttons, or the like that may be opened and closed as necessary or helpful to secure medical equipment around the subject 202.

It will be understood that the first surface 111 and the second surface 112 of the conformable structure 110 may be hingeably coupled to one another. That is, one or more hinge regions 218 may be disposed between sections of the conformable structure 110—e.g., between the first surface 211 and the second surface 212—in a circumferential direction of the conformable structure 110 in the wrapped position about the subject 202 (see, e.g., FIG. 3). The conformable structure 110 may be most flexible along the hinge region 218 in order to facilitate opening and closing of the surfaces 111, 112 of the conformable structure 110 about the subject 202.

Figure 3:
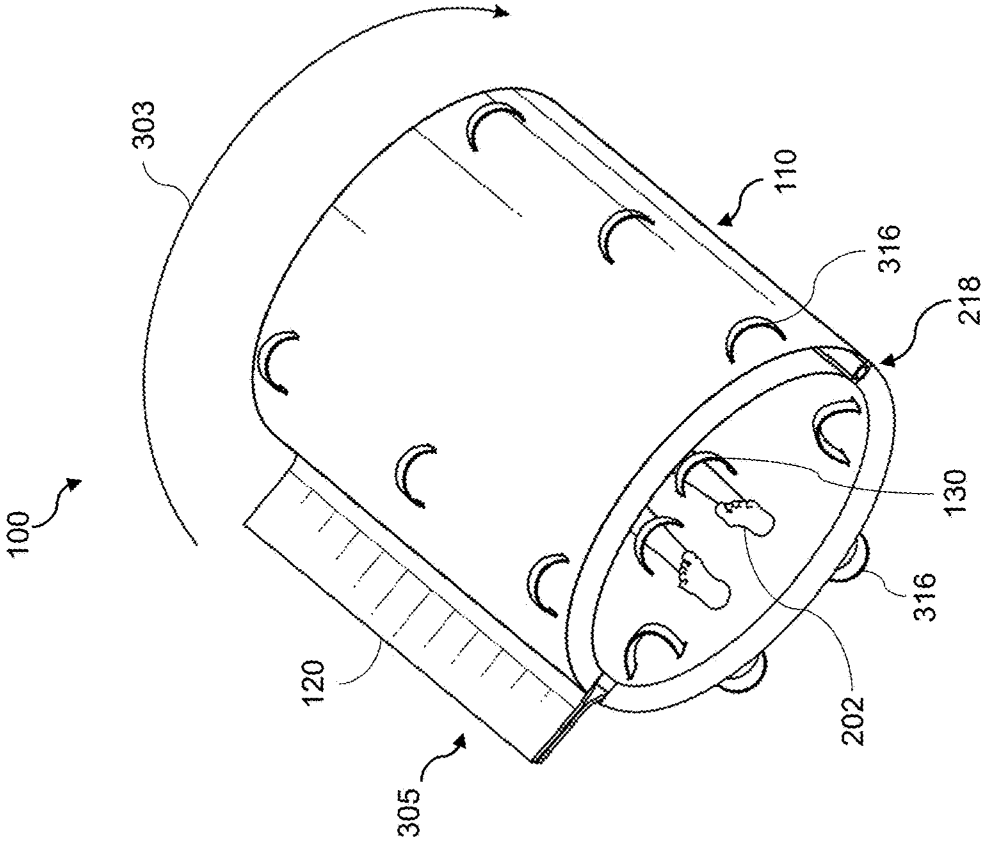
FIG. 3 is a schematic representation of the subject circumscribed by a shell and a fastener of the proning device of FIG. 1, with the proning device shown rotating in a clockwise direction.

Referring now to FIGS. 2 and 3, the conformable structure 110 may be wrapped about a portion of a circumference of the subject 202. With the conformable structure 110 in this wrapped position, the shell 120 may be releasably secured around an exterior of the conformable structure 110 such that the shell 120 and the conformable structure 110 collectively circumscribe the subject 202. In general, the shell 120 may be adjustable via one or more straps, belt tensioners, cinches, or the like to permit an increase or decrease in radial tension after the shell 120 is secured around the conformable structure 110. This advantageously permits control of tension after the shell 120 is secured in order to reduce the likelihood of applying too much or too little pressure to the subject 202 wrapped in the conformable structure 110 and the shell 120. The shell 120 may include a hook and loop fastener or similar coupling surfaces such that the shell 120 includes at least two portions that cooperate with one another. Other types of fasteners may also or instead be used such as straps, ties, buttons, hooks, snaps, friction fits, sliders, protrusions and/or depressions/voids, and so on. In on aspect, e.g., where two sides of the shell 120 are fastened with mating hook-and-loop surfaces, two joined surfaces of the shell 120 may extend as shown in FIG. 3 to provide a gripping tab 305 or surface for gripping and manipulation of the device 100.

In one aspect, the continuous sheet forming the shell 120 may be formed in whole or in part of hook and loop fastening material or the like, or the continuous sheet may include such a fastening material extending beyond a perimeter of the shell 120 (when wrapped about a subject 202) where the material can be turned back upon itself and/or fastened to an opposing sheet of complementary fastening material. In this configuration, a portion of the shell 120 may extend beyond the elliptical cross section to provide a handle or pull element 322 to assist with rotating the shell and the subject 202 between prone and supine positions.

Figure 4:
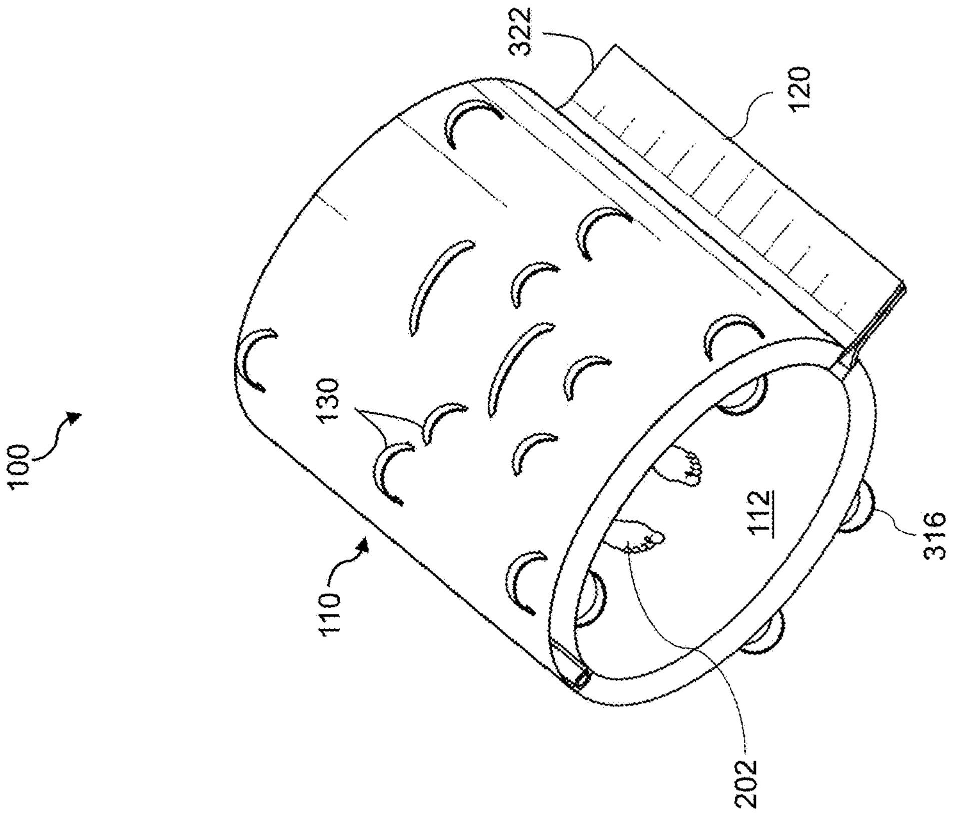
FIG. 4 is a schematic representation of the subject circumscribed by the shell and the fastener of the proning device of FIG. 1, with the proning device rotated 180 degrees clockwise from the orientation shown in FIG. 3.

Referring now to FIGS. 3 and 4, the proning device 100 may be rotated (e.g., in a clockwise direction as indicated by the arrow 303 in FIG. 3) such that the subject 202 wrapped in the proning device 100 is also rotated. For example, the proning device 100 may be rotated as one or more staff members pull one or more of the pull elements 316 coupled to the conformable structure 110 and extending away from an exterior surface of the shell 120. As compared to proning techniques that require lifting the subject 202, the rotatability of the proning device 100 using one or more of the pull elements 316 may facilitate proning the subject 202 using fewer staff members.

Referring now to FIG. 4, with the subject 202 rotated to the prone position, the restraints 130 may be released through accessibility provided by the shell 120 and along the second surface 112 of the conformable structure 110. That is, the restraints 130 may be released from the outside of the enclosure collectively formed by the shell 120 holding the conformable structure 110 in the wrapped position. This facilitates removal of a portion of the proning device 100 from the subject 202 to provide access to the subject 202 without the need to lift the subject 202 off the device 200.

Referring now to FIGS. 4 and 5, with the restraints 130 released from the subject 202 and the shell 120 opened, the conformable structure 110 may be unwrapped in a direction away from the subject 202, who is now in the prone position. In certain implementations, the conformable structure 110 may remain beneath the subject 202 until it becomes necessary or desirable to rotate the subject 202 again by reversing the steps described above. It will be understood that, while the shell 120 and the conformable structure 110 are described as separate structures with separate functions, one or more structures may, in some embodiments, combine the functions of both the shell 120 and the conformable structure 110. For example, the proning device 100 may be formed in part of inflatable, radial sections that have a more rigid exterior surface that forms a part of the elliptical cross section, and a less rigid interior that generally conforms to the subject 202 upon inflation. These and other variations are discussed below.

A first section and a second section (corresponding to the first surface 111 and the second surface 112) of the conformable structure 110 may be coupled by a hinge 218 (or a hinge region) extending therebetween in a circumferential direction (when wrapped). The hinge 218 or hinge region may generally be a most flexible region of the conformable structure 110 in the circumferential direction to facilitate unfolding of the first surface 111 and the second surface 112 to release the subject 202 from the proning device 100. The first section and the second section may also be detachable from one another along the hinge 218, which may include a zipper, hook-and-loop fastening strip(s), or the like to facilitate detachment and reattachment. In one aspect, the hinge 218 may be oriented diametrically opposed to the fastener around a circumference of the device 100 when wrapped. That is, the hinge 218 may run along one edge of the device 100 and the fastener(s) may run along an opposing edge to collectively form a clamshell arrangement for opening and closing the device 100 around a subject. In general, the circumferential span of the fastener, or more generally, the shell 120 secured by the fastener, may be adjustable relative to the largest circumference of the shell 120 when wrapped around a subject in order to facilitate sizing to different bodies and control of tension after a patient is secured and enclosed for proning within the proning device 100. The fastener may include mating hook and loop surfaces, and may be adjustable in the first instance by positioning of the hook and loop surfaces before contact. The fastener may also or instead include tensioning belts, straps, and/or any other mechanisms suitable for securing the proning device 100 across adjacent portions of the shell 120 in order to securely enclose and retain the subject and the conformable structure 110 for proning.

The conformable structure 110 may include a foam or the like in the first surface 111 and/or the second surface 112. For example, the conformable structure 110 may be formed in whole or in part of a viscoelastic foam such as a polyurethane with additives to increase viscosity and density. The foam may be formed of open cells to create a matrix that can circulate air, and may soften in response to body heat in order to conform more completely and evenly when wrapped about a human body. These viscoelastic foams also usefully recover their original shape relatively quickly, and may be reused with different subjects having different body shapes. The conformable structure 110 may also or instead include a number of modular pillows, pads, or the like that can be rearranged to more closely conform to the shape of a subject placed within the conformable structure 110. In another aspect, the conformable structure 110 may include resilient flowable pellets formed of expandable polystyrene foam or the like, enclosed within one or more enclosures such that the pellets can flow and redistribute in response to incident forces. This so-called bean bag construction permits the conformable structure 110 to easily adapt to the shape of a body placed within the interior, and to redistribute forces more evenly throughout the interior when a shell 120 is secured around the conformable structure 110 and tensioned.

In another aspect, the conformable structure 110 may include one or more inflatable chambers that can be individually or collectively inflated to a pressure suitable for supporting the distributed weight of a body placed within the interior of the device. These inflatable chambers may be inflated before the shell 120 is secured around the conformable structure 110, after the shell 120 is secured around the conformable structure 110, or some combination of these. The device 100 may include a pressurized fluid source such as the pump described below, which may be coupled to one or more of these inflatable chambers and operable to controllably inflate the one or more inflatable chambers to secure the subject within the proning device 100. It will also be understood that these conformable structures 110—foam padding, flowable pellets, shaped pads, and inflatable chambers—may be used alone or in any combination according to the desired degree of geometric fit, patient comfort, and the like.

The device 100 may include any number and arrangement of restraints 130 for securing a subject within the device 100. Restraints 130 for the subject may generally be arranged spaced apart from one another along an interior surface of the conformable structure 110, e.g., the first surface 111 described above, such that each limb and a torso of the subject are securable to the first surface 111 of the device 100 by one or more respective restraints 130 of the plurality of restraints 130.

The device 100 may also or instead include a plurality of guide loops 214. Each guide loop 214 may be coupled to the shell 120, the conformable structures 130, or some combination of these to assist in guiding and retaining medical equipment such as tubes, wires, and so forth. For example, the guide loops 214 may be positioned and sized to retain foley catheters, intravenous and central line tubing, cardiac monitoring wires, pulse oximetry lines, and so forth. In one aspect, the guide loops 214 may be spaced relative to one another such that the subject is positionable between the plurality of guide loops 214, and each guide loop 214 may be configured to hold one or more elongate portions of medical devices in a substantially fixed orientation extending from the subject to a position away from the subject when the subject is positioned on the first surface 111. The shell 120 and conformable structure 110 may be wrappable such that the plurality of guide loops 214 remain on one side of a frontal plane of the subject positioned on the first surface 111 of the conformable structure 110. One or more of the guide loops 214 may also or instead be positioned along a peripheral portion of the first surface 111. One or more of the guide loops 214 may be adjustable in size and/or repositionable to facilitate use with different medical equipment.

The device 100 may also or instead include a plurality of pull elements 316 coupled to the shell 120 and extending from the shell 120 in a direction away from the second surface 112, e.g., to permit grasping and movement of the device 100 for proning and other physical maneuvering when a subject is secured within the device 100. The shell 120 and conformable structure 110 may be secured around the subject such that the plurality of pull elements 316 are disposed on both sides of a frontal plane of the subject positioned on the second surface 112 of the conformable structure 110. One or more of the pull elements 316 may be spaced circumferentially apart from one another in a direction parallel to a circumferential direction (e.g., around the axis 101) of the shell 120 in the wrapped position so that one or more of the pull elements 316 are always positioned for use in rotating the device 100. Typically, although not necessarily, pull elements 316 may usefully be positioned near a top of the device 100 and on a side of the device 100 to assist a user in imparting rotational forces about the axis of the device 100. One or more of the pull elements 316 may also or instead be spaced axially apart from one another along the axis 101 in a direction perpendicular to a circumferential direction of the shell 120 in the wrapped position.

Figure 7A:
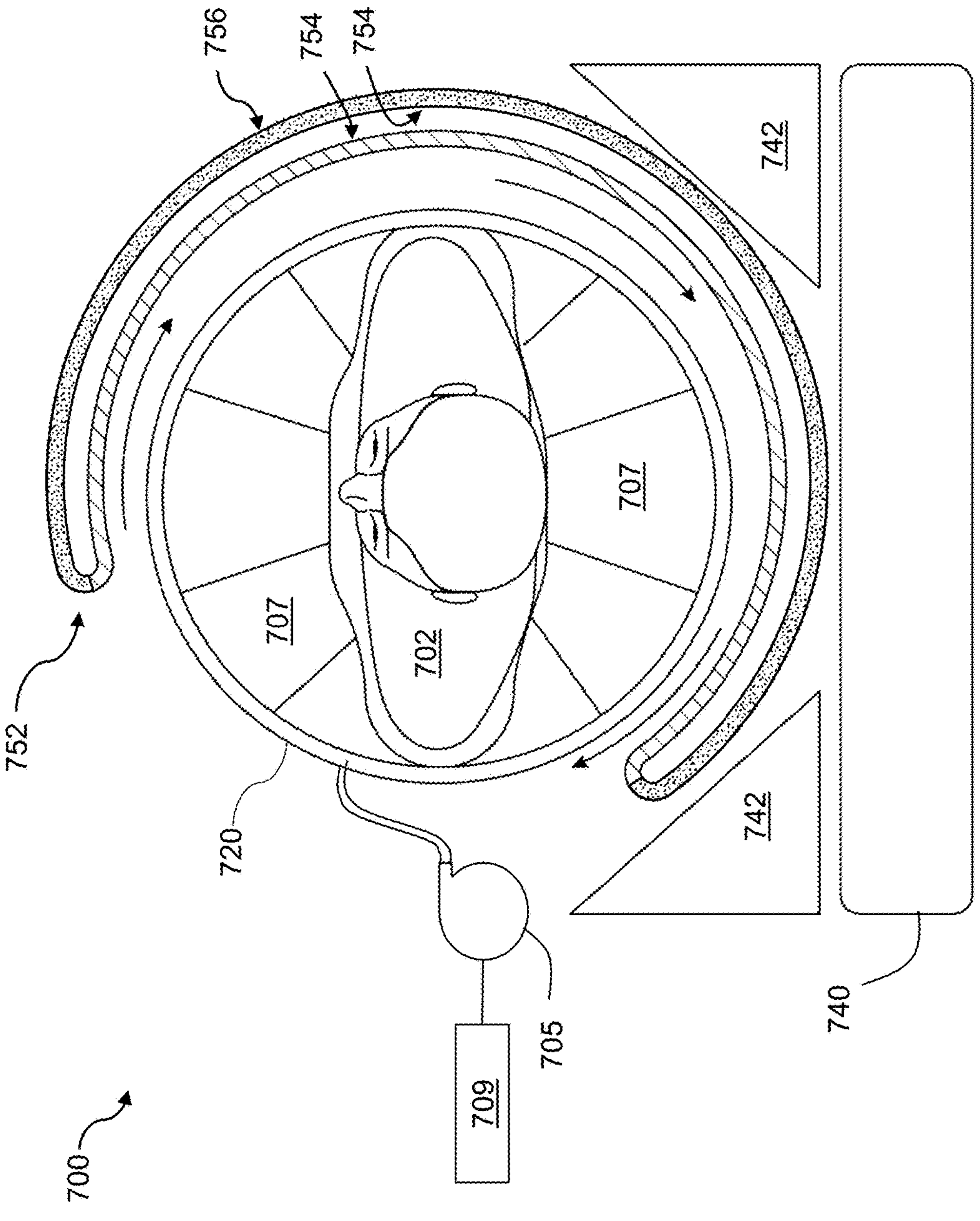
FIG. 7A is a schematic representation of a side view of a proning device including a bedding surface and a shell, the shell shown disposed about a subject and regions of the bedding surface movable relative to one another to rotate the shell.

In general, the device 100 my include a pressurized fluid source such as an air pump or other pump (referred to generally herein as a "pump") such as the pump shown with reference to FIG. 7A. This pump 705 may be used for a variety of purposes. In one aspect, the pump 705 may be used to control inflation of inflatable chambers 707 within the conformable structure 110. Thus, in one aspect the conformable structure 110 may include an inflatable chamber 707 within at least one of the first surface 111 and the second surface 112 that is coupled in fluid communication with the pump 705, by which the inflatable chamber(s) 707 may be controllably inflated and deflated in order to controllably conform the conformable structure 110 to a subject placed in the device 100. The inflatable chambers 707 may also form, or assist in forming, the shell 120. For example, the inflatable chambers 707 may be coupled in fluid communication with a pressurized fluid source such as the pump 705 and inflatable to impart a substantially elliptical cross section to the proning device 100. In this disclosure, it will be understood that a substantially elliptical cross section is intended to include a circular cross section, although a non-circular, elliptical cross section may also advantageously promote positional stability along the major axis, that is, with the patient rotated into the prone or supine positions. It should further be appreciated that a substantially elliptical cross section as used herein is also intended to refer to cross sections that deviate somewhat from a strict geometrically elliptical shape but remain generally rounded in a manner that facilitates rotation of the proning device 100 about the axis 101 by excluding significant angular edges, shelves, discontinuities, or the like that might otherwise interfere with rotation (and any accompanying sliding to prevent lateral movement of the device 100 during rotation).

A controller 709 may also be provided to support manual or automated inflation of the inflatable chamber(s) 707 with the pump 705 once the subject is placed within the device 100. For example, the controller 709 may be configured, e.g., by computer executable code, firmware, or the like, to receive a signal indicative of a pressure within the inflatable chamber 707 or on the first surface 111, to compare this signal to a threshold value, and based on the comparison of the signal to the threshold value, and to take a remedial action based on the comparison of the signal to the threshold value such as operating the pump 705 (or an accompanying bleed valve or the like) to increase pressure or decrease pressure within the inflatable chamber 707. The device 100 may also include one or more pressure sensors or the like configured and positioned to measure a corresponding pressure and provide the signal to the controller 709. The controller 709 may also include a user interface for displaying information such as the current pressure of one of the inflatable chambers 707, a status of the pump 705, or a user alert concerning an error, warning, or the like. While a pump 705 is described, it will be understood that any other pneumatic supply, actuator, valve, or combination of these may also or instead be used.

Also disclosed herein is a method of proning a subject. In general, the method may include applying restraints to a subject positioned on a first surface of a conformable structure, wrapping the conformable structure in a shell about the subject restrained to the first surface, securing the shell with one or more fasteners such that the shell, fastener (s) and conformable structure collectively circumscribe a largest circumference of the subject, and, with the fastener secured about the shell, turning the subject about a longitudinal axis of the subject, and then removing the restraints from the subject with the subject in a prone position.

In the method, applying the restraints to the subject may include substantially fixing positions of each limb and a torso of the subject relative to the first surface of the conformable structure. Securing the shell may include adjusting a size of the fastener according to the largest circumference of the subject. Turning the subject may include turning the subject about a longitudinal axis of the subject (or the axis of the proning device) by about 180 degrees. Turning the subject may also or instead include pulling a plurality of pull elements coupled to the shell and extending from the shell in a direction away from the second surface.

The method may include securing one or more elongate portions of medical devices in a plurality of guide loops, each guide loop extending from the shell in a direction away from the first surface, and each guide loop holding the one or more elongate portions of the medical devices in a substantially fixed orientation extending from the subject to a position away from the subject positioned on the first surface. Applying restraints to the subject may include applying the restraints to the subject between the guide loops. Turning the subject about the longitudinal axis of the subject may include maintaining each guide loop on one side of a frontal plane of the subject positioned on the first surface of the shell. The method may further include detaching a first surface of the conformable structure from a second surface of the conformable structure after turning the subject about the longitudinal axis. In one aspect, the method may include inflating an inflatable chamber within the conformable structure to support the subject within the device.

Referring now to FIGS. 6A-6E, a proning device 600 may include a bedding surface 640 and a shell 620. The proning device 600 may also include any of the conformable structures described herein, although the conformable structure is omitted from this figure for simplicity. The bedding surface 640 may be an inflatable surface that is inflatable (using a pressurized fluid supply or pump 605) from an uninflated state (see FIG. 6A) to an inflated state (see FIG. 6B). With a first surface of the shell 620 wrapped about at least a portion of a subject 602, the shell 620 may be rotated along a low-friction interface 642 between the bedding surface 640 and the shell 620. For example, the low-friction interface 642 between the bedding surface 640 and a surface of the shell 620 may be created by a plurality of orifices (represented by the arrows 644 included in FIG. 6E, where such arrows 644 may also or instead indicate the direction of a flow or air through the orifices) that provide a flow of air to reduce the coefficient of friction between the physical surfaces of the shell 620 and the bedding surface 640. Thus, in one aspect, a low-friction interface 642 below an exterior surface of the shell 620 may facilitate rotation of the proning device 600 about an axis without translating into lateral movement by the device 600 along the bedding surface 640. As described above, to maintain this low-friction interface 642, the pump 605 may provide a pressurized air source that creates an air cushion between the shell 620 and the bedding surface 640.

The bedding surface 640 may also advantageously include raised edges 670 positioned to retain the proning device 600 within the bedding surface 640 during rotation or other manipulation. The raised edges 670 may be created, e.g., with inflatable chambers along the periphery of the bedding surface, pillows, foam ridges, or any other combination of structures that resist lateral motion of the device 600 during rotation about the axis, e.g., by presenting barriers to lateral movement with a greater elevation than a center 672 of the bedding surface 640 where the proning device 600 is retained.

Referring now to FIGS. 7A-8D, a proning device 700 may include a shell 720 and a bedding surface 740. The bedding surface 740 may include raised edges 742 created by foam pads or the like that resist lateral motion of the device 700 during rotation. A subject 702 may be retained within the device 700 by a conformable structure such as one or more inflatable chambers 707 that can be inflated by a pump 705.

The device 700 may include a low-friction interface 752 between the shell 720 and the bedding surface 740 formed by a closed loop of deformable sheet material. The low-friction interface may operate by permitting interior surfaces 754 of the closed loop to slide easily against one another. That is, the deformable sheet material may have an interior surface with a low self-coefficient of friction for internal contact established by the static or kinetic coefficient of friction for the interior of the material sliding against itself under a normal load. The deformable sheet material may also have an exterior surface 756 with a (static or kinetic) coefficient of friction with the shell 720 and/or the bedding surface greater than the self-coefficient of friction for the interior surface. A wide variety of low coefficient of friction (COF) materials are known in the art, including a number of plastics suitable for use in a medical environment such as polytetrafluoroethylene, polyether ether ketone, nylon, acetal, and polyester, any of which may be adapted for use as a low COF material or coating for an internal surface of the deformable sheet material. In addition, wet or dry lubricants may be used to further reduce the self-coefficient of friction within the interior surfaces. Similarly, many high COF materials are known and may be used to engage frictionally with the shell 720 on an exterior surface of the deformable sheet material. With materials selected in this manner, the overall coefficient of friction that resists rotation of the device 700 will be primarily determined by the self-coefficient of friction for internal contact within the deformable sheet material. With a combination of a generally circular or elliptical cross section of the shell 720 and a low self-coefficient of friction within the deformable sheet material, the device 700 may be rotated, and the subject 702 proned, with relative ease by a small number of people.

Figure 7B:
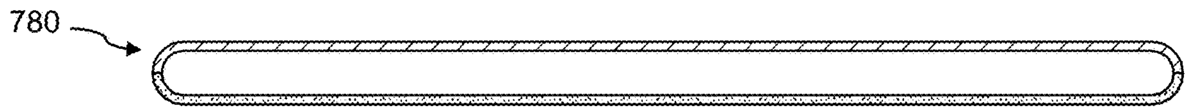
FIG. 7B is a schematic representation of a cross-sectional side view of the bedding surface of the proning device of FIG. 7A.
Figure 7C:
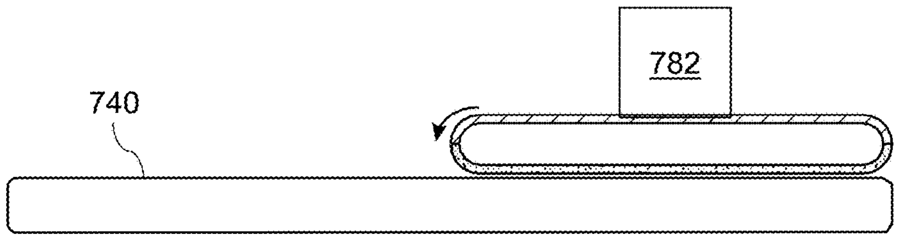
FIG. 7C is a schematic representation of the cross-sectional view of the bedding surface of the proning device of FIG. 7A shown in frictional engagement with a bed.
Figure 7D:
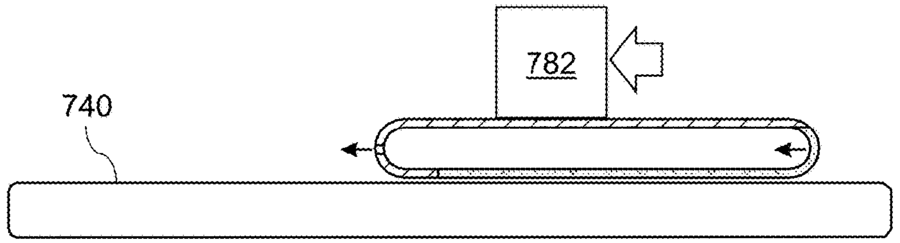
FIG. 7D is a schematic representation of the cross-sectional view of the bedding surface of the proning device of FIG. 7A, with relative movement of a first region and a second region of a wall of the bedding surface shown the bedding surface is in frictional engagement with the bed as shown in FIG. 7C.
Figure 8B:
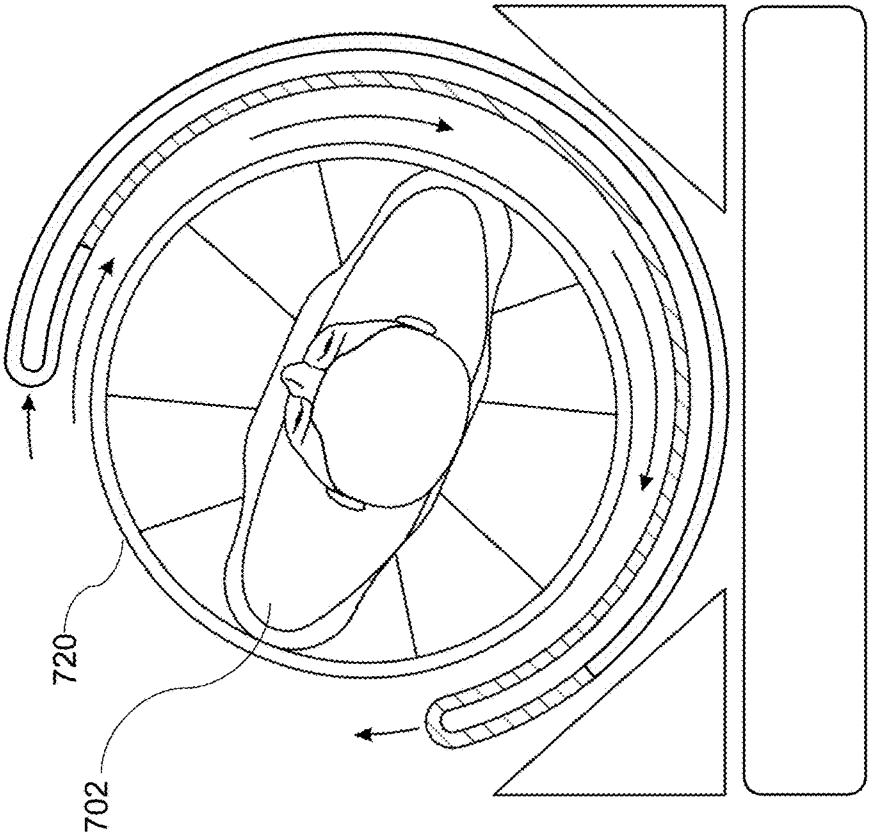
FIG. 8B is the second schematic representation of a temporal sequence of relative movement of the first region and the second region of the wall of the bedding surface of FIGS. 7A-7D to prone a subject wrapped in the shell of FIG. 7A.
Figure 8A:
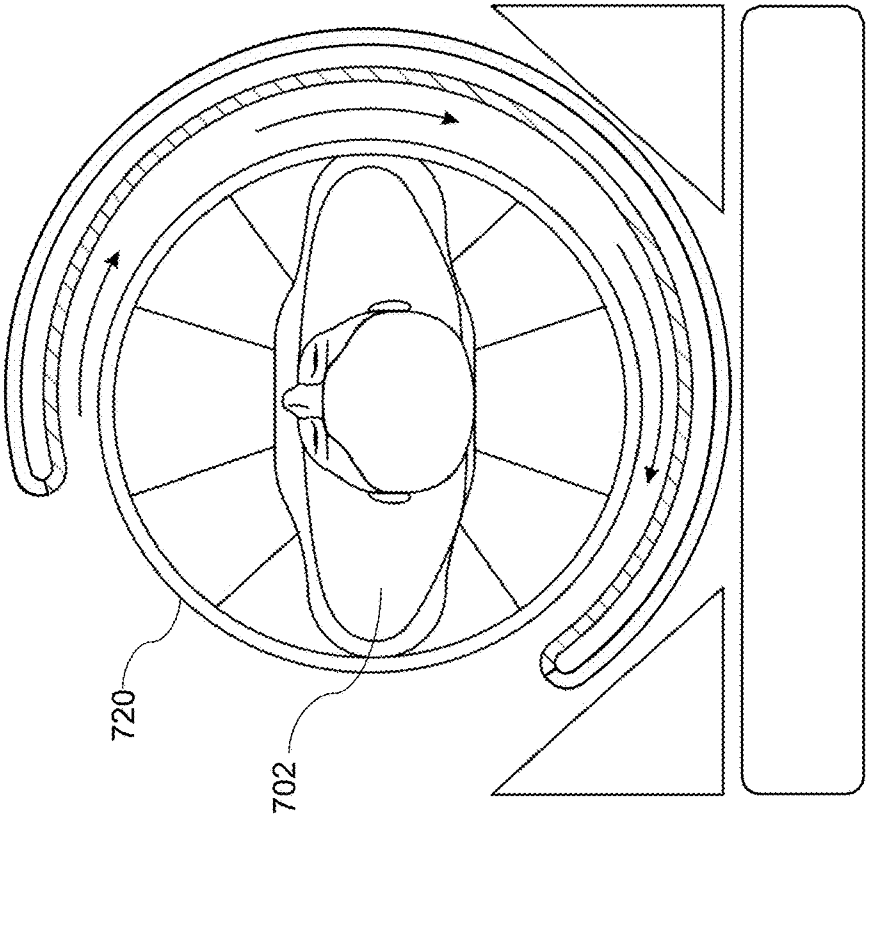
FIG. 8A is the first schematic representation of a temporal sequence of relative movement of the first region and the second region of the wall of the bedding surface of FIGS. 7A-7D to prone a subject wrapped in the shell of FIG. 7A.
Figure 8D:
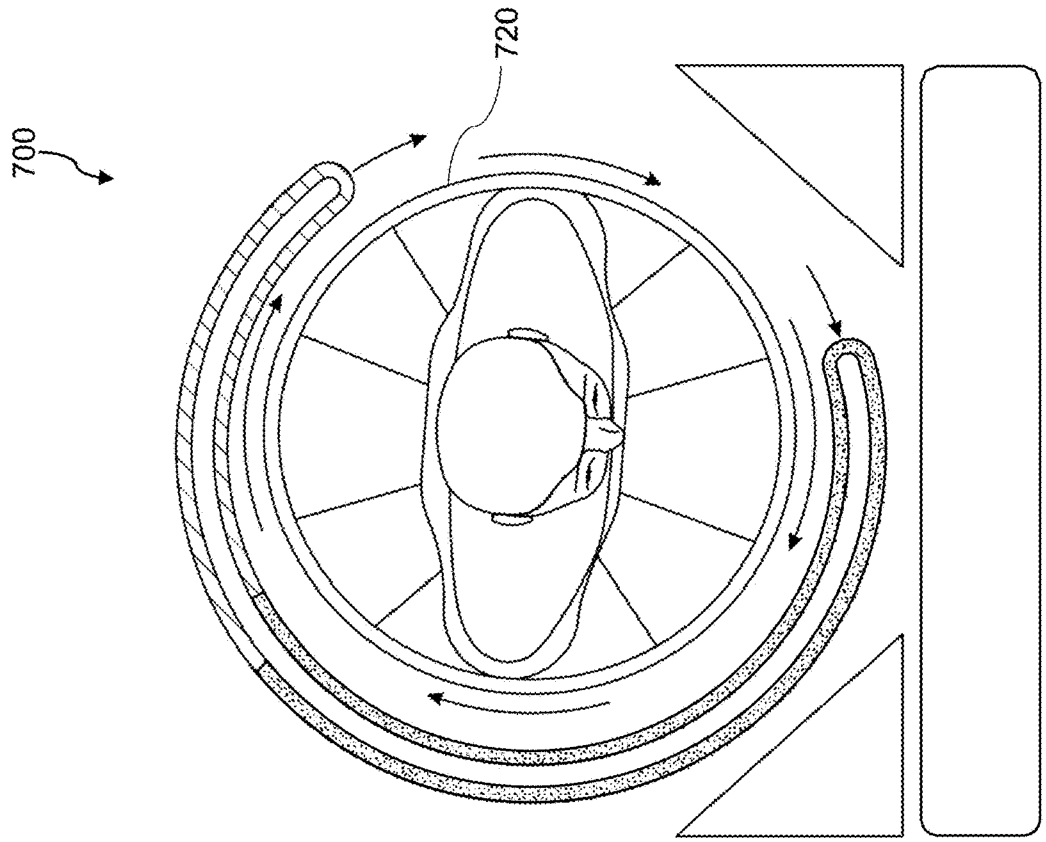
FIG. 8D is the fourth schematic representation of a temporal sequence of relative movement of the first region and the second region of the wall of the bedding surface of FIGS. 7A-7D to prone a subject wrapped in the shell of FIG. 7A.
Figure 8C:
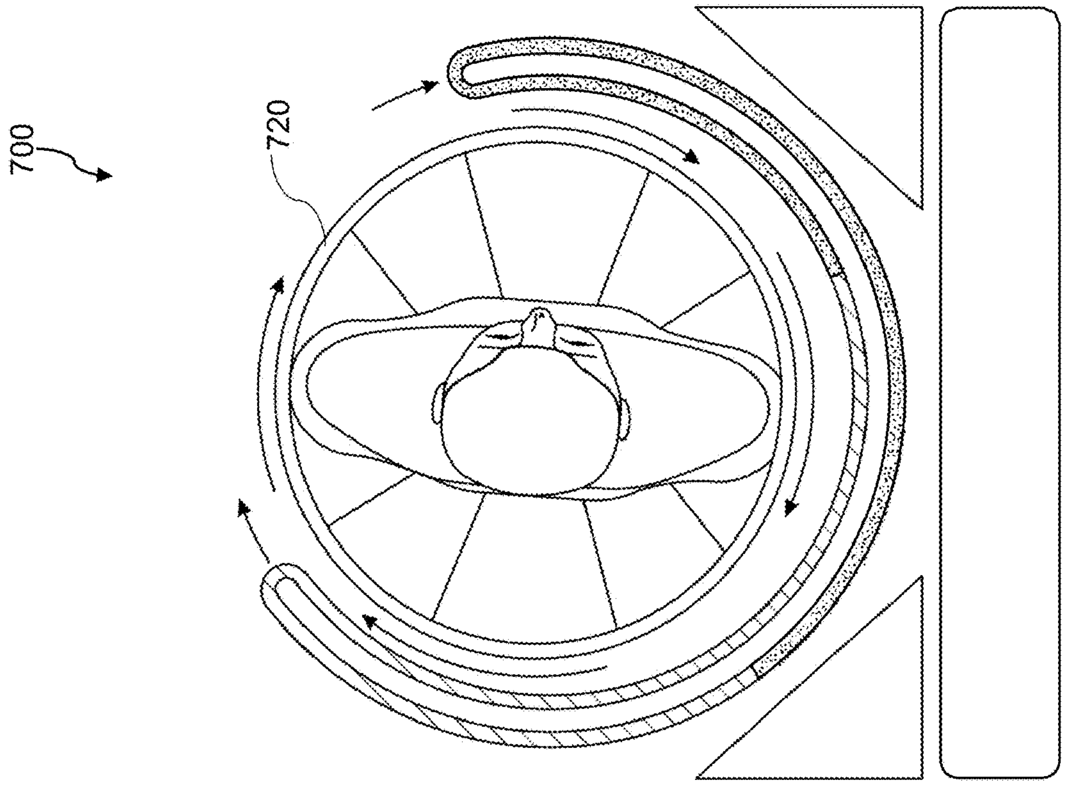
FIG. 8C is the third schematic representation of a temporal sequence of relative movement of the first region and the second region of the wall of the bedding surface of FIGS. 7A-7D to prone a subject wrapped in the shell of FIG. 7A.

FIGS. 7B-7D illustrate a closed loop of deformable sheet material 780 creating a low-friction interface as described above. In this example, the low-friction interface is deployed to facilitate low-resistance, lateral movement along a bedding surface 740 under a load 782 using the same principles as described above. FIGS. 8A-8D illustrate the same principle of operation deployed to facilitate proning of a subject 702 within a shell 720.

Referring now to FIGS. 9A-9D, a proning device 900 may include a shell 920, a conformable structure 910, and one or more pull elements 916 coupled to the shell 920 (and/or conformable structure 910). The conformable structure 910 may include a first surface 911 and a second surface 912 opposite the first surface 911. The first surface 911 may, for example, define a recess 913 within the conformable structure 910 supporting at least a portion of a subject 902 to facilitate positioning and retention of the subject 902 relative to one or more guide loops 914 arranged along the first surface 911. The recess 913 may, for example, be sized to accommodate a torso and arms of the subject, and a corresponding recess may be provided in the second surface 912 in order to urge the subject 902 toward a center of the device 900 during use. Such consistent positioning of the subject 902 relative to the one or more guide loops 914 may be useful for managing tubes attached to the subject 902 and, thus, reducing the likelihood of interference with ongoing treatment of the subject 902 as the subject 902 is proned. In certain instances, the conformable structure 910 may include a first portion 915 and a second portion 917 corresponding to the first surface 911 and the second surface 912, and moveable relative to one another (e.g., in a clam-shell arrangement). One or more of the first portion 915 of the conformable structure 910 and the second portion 917 of the conformable structure 910 may be inflatable such that, collectively, the first portion 915 of the shell 920 and the second portion 917 of the conformable structure 910 define a substantially cylindrical tube enveloping at least a portion of the subject 902. The subject 902 may be proned by pulling one or more pull elements 916 of the proning device 900 to rotate the cylindrical tube—and the subject 902 enveloped therein—about a longitudinal axis defined by the cylindrical tube. The resulting rotation of the cylindrical tube and the subject 902 may facilitate proning the subject 902.

The proning device 900 may also usefully incorporate a number of pull straps 922 that may be used alone or in combination with the pull elements 916 to rotate the proning device 900 when closed about a subject. These pull straps 922 may be usefully spiraled about the proning device 900, either before a subject is placed in the device 900, after a patient is proned, or some combination of these, and provide a useful structure for imparting rotational force about the proning device 900 in order to rotate the proning device 900 about an axis.

Figure 9A:
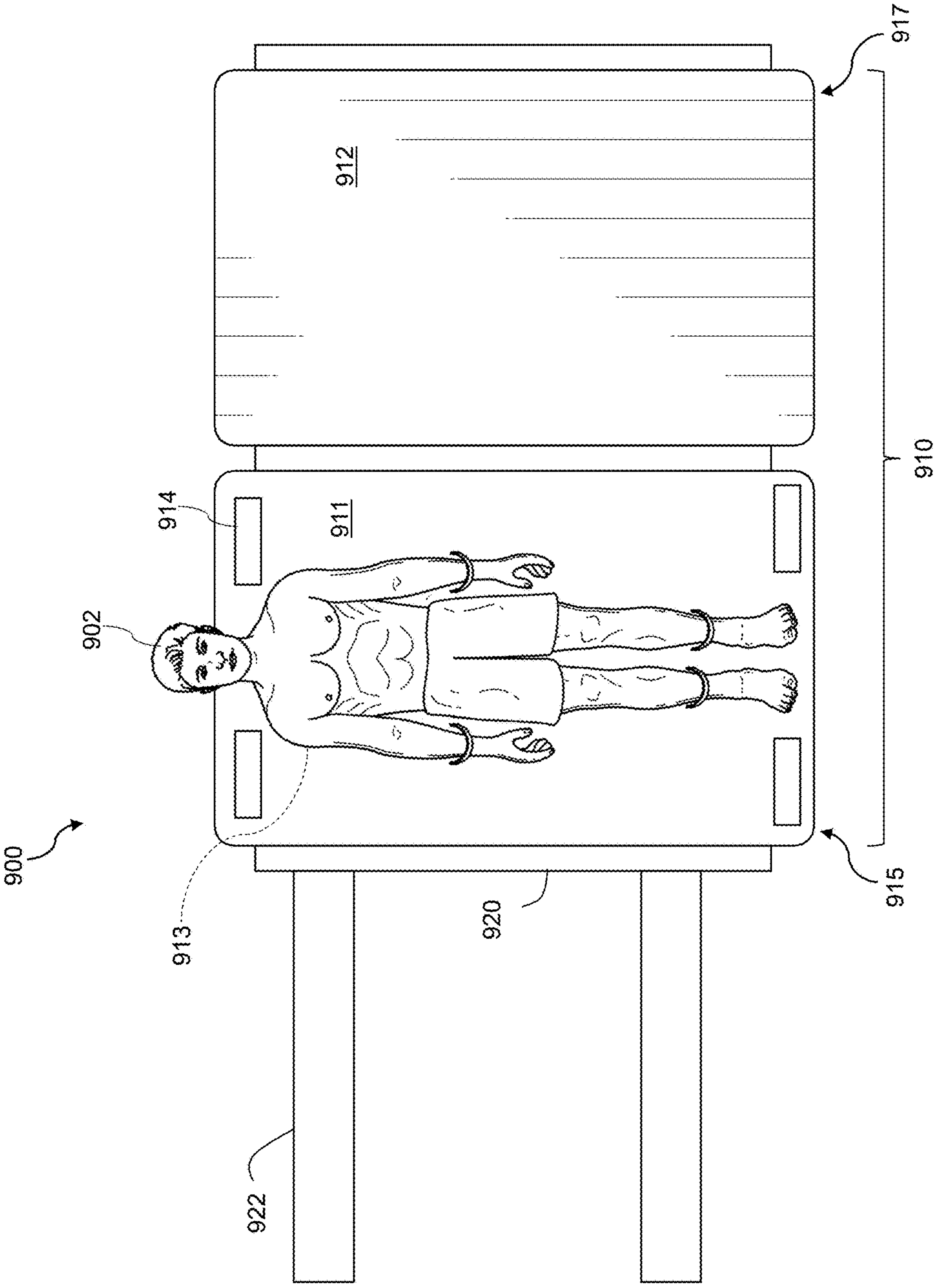
FIG. 9A is a schematic representation of a top view of a proning device, shown with a first surface of a shell positioned along a subject.
Figure 9B:
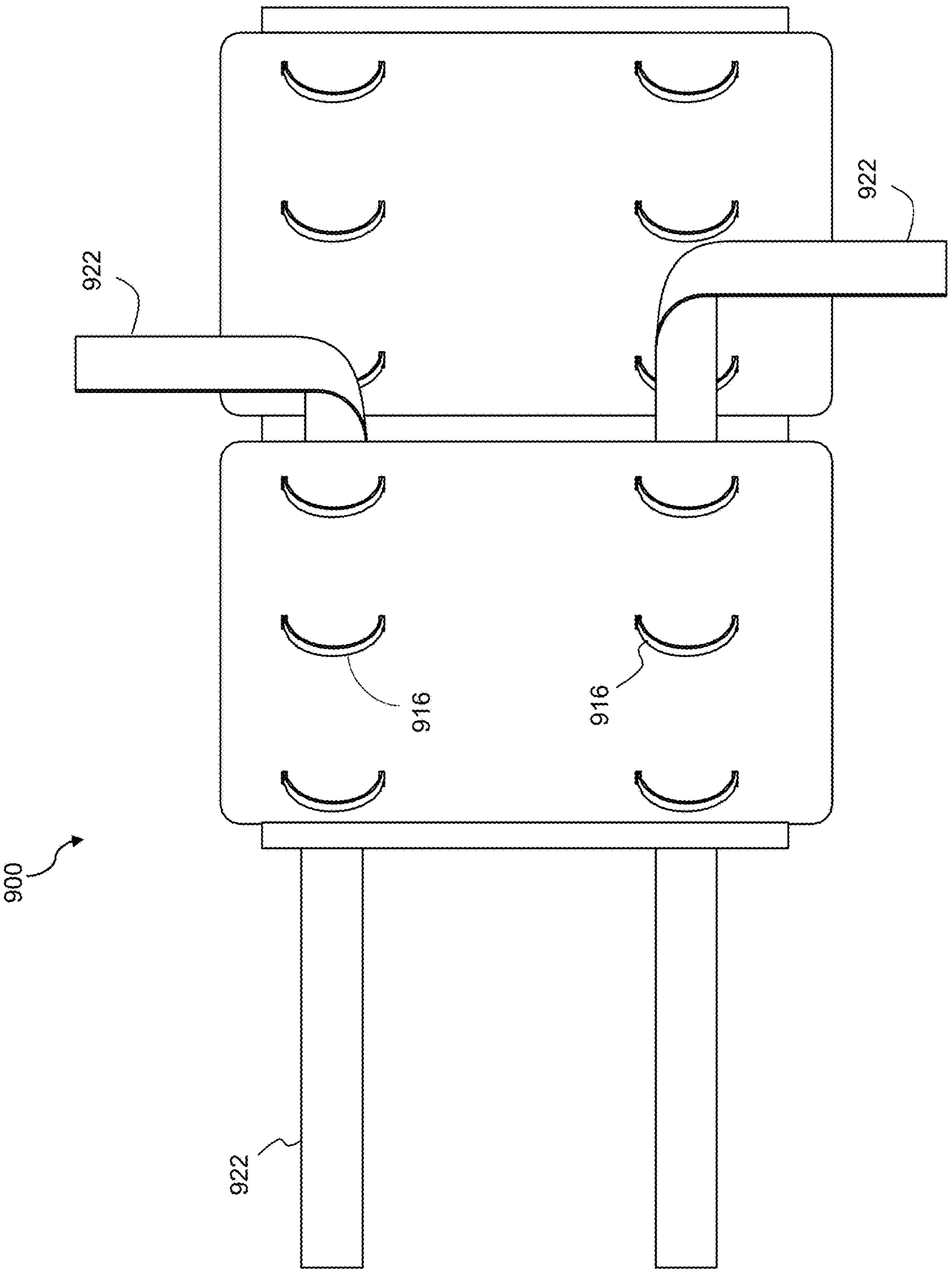
FIG. 9B is a schematic representation of a bottom view of the proning device of FIG. 9A, with a second surface of the shell opposite the first surface of the shell.
Figure 9C:
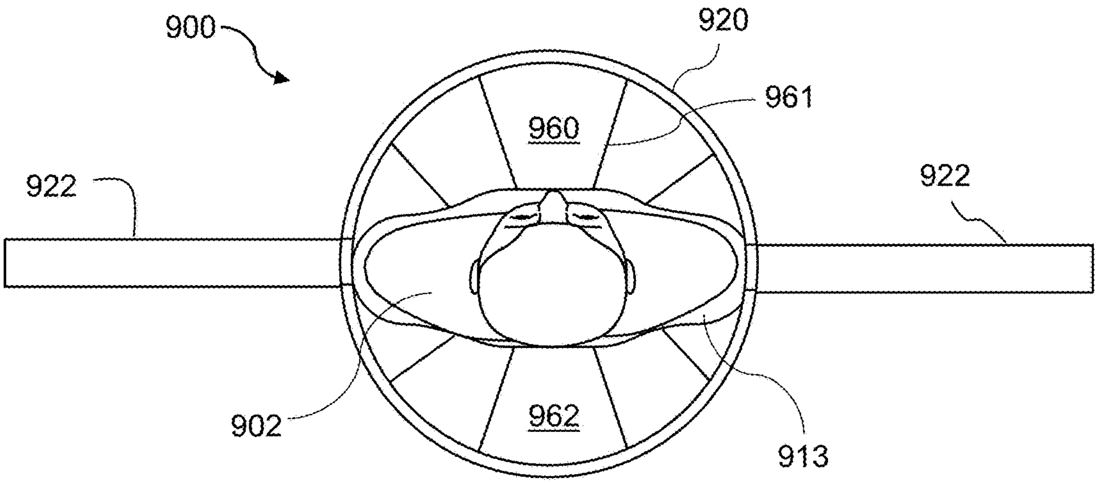
FIG. 9C is a schematic representation of a side view of the proning device of FIG. 9A, shown with the shell wrapped about at least a portion of the subject.
Figure 9D:
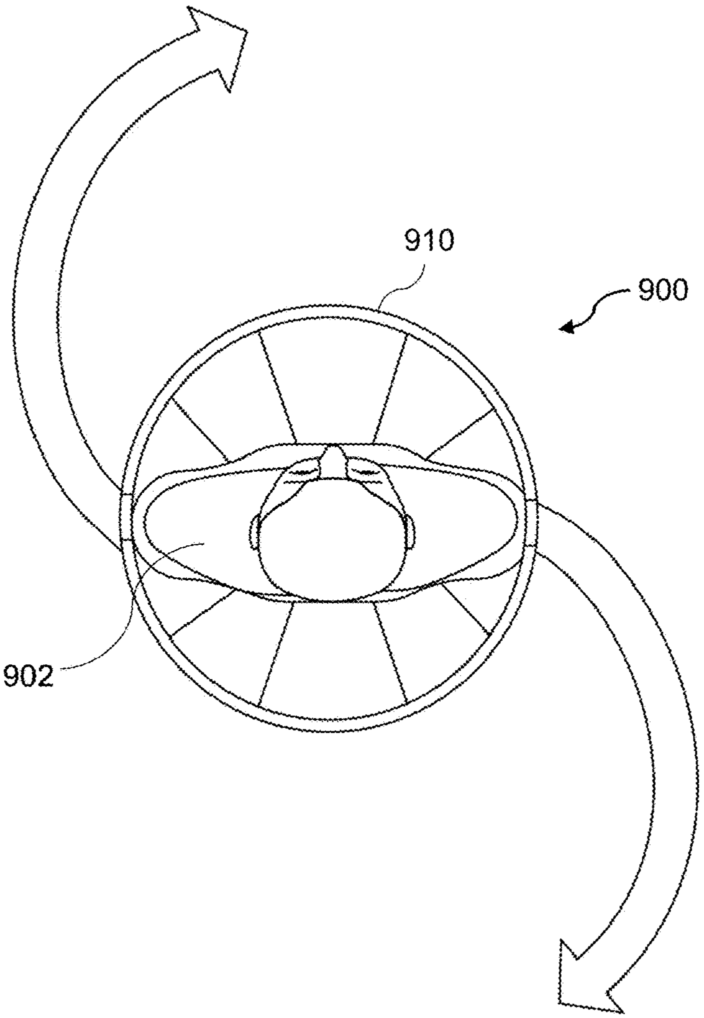
FIG. 9D is a schematic representation of a side view of the proning device of FIG. 9C, shown in rotational motion.

As shown in FIGS. 9C and 9D, the proning device 900 may include a shell 920 with sections (e.g., the first portion 915 and the second portion 917 or any other pads, chambers, or the like) that engage and cooperate to define a substantially cylindrical tube enveloping at least a portion of the subject 902. One or more of these sections may include inflatable chambers. For example, the conformable structure 910 may define a first inflatable chamber 960 and a second inflatable chamber 962, where these inflatable chambers 960, 962 are disposed between the first surface 911 and the second surface 912 of the conformable structure 910. In certain aspects, one or more septations 961 or other cavities, spacings, separation structures or the like are present between one or more portions of the inflatable chambers 960, 962, either to impart physical structure in the absence of inflation, or to impart shape to the inflated device 900. In one aspect, the shell 920 may form a substantially cylindrical shape (in the absence of external forces) when the inflatable chambers 960, 962 are inflated to some predetermined pressure. In general, the inflatable chambers 960, 962 may be coupled in fluid communication with one another, or fluidically isolated from one another. In one aspect, a plurality of inflatable chambers may be independently inflatable relative to one another, e.g., to permit controlled distribution of inflation for improved comfort of the subject, improved overall shape, or some combination of these.

It will also be appreciated that the device 900 of FIGS. 9A-9D may also include a low-friction interface between the shell 920 and a bedding surface such as any of the low-friction interfaces described herein. In one aspect, the low-friction interface may include a material on the bedding surface or on an exterior of the shell 920, or some combination of these, selected for a low coefficient of friction between the exterior of the shell 920 and the bedding surface.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A patient proning device including:

a conformable structure shaped and sized to enclose a front and back of a human body while exposing at least a head of the human body along an axis of the conformable structure aligned to the human body when the human body is placed within the conformable structure, the conformable structure including one or more inflatable chambers, and one or more non-stretchable panels enclosing the one or more inflatable chambers;

one or more hinges along an edge of the conformable structure that hingeably couple portions of the conformable structure to one another to facilitate opening the conformable structure to receive the human body and closing the conformable structure to enclose the human body;

one or more fasteners along an opposing edge of the conformable structure to the one or more hinges to form a clamshell arrangement with the one or more hinges for opening and closing the patient proning device around the human body; and a pressurized fluid source coupled to the one or more inflatable chambers and operable to controllably inflate the one or more inflatable chambers causing the conformable structure to form a substantially cylindrical shape parallel to the axis of the conformable structure aligned to the human body;

a low-friction interface on an exterior surface of the conformable structure, the low-friction interface having a low coefficient of friction with a bedding surface, the low-friction interface configured to facilitate a rotation of the conformable structure about the axis on the bedding surface when the conformable structure is positioned on the bedding surface and the conformable structure is enclosed and fastened about the human body.

2. The patient proning device of claim 1, further comprising the bedding surface, wherein the bedding surface includes raised edges to resist translation of the conformable structure relative to the bedding surface during rotation of the conformable structure.

3. The patient proning device of claim 2, wherein the low friction interface includes a closed loop of a deformable sheet material disposed between the conformable structure and the bedding surface, an interior surface of the closed loop of the deformable sheet material having a self-coefficient of friction for internal contact, wherein a second exterior surface of the closed loop of the deformable sheet material has a coefficient of friction with the conformable structure and the bedding surface greater than the self-coefficient of friction for the internal contact.

4. The patient proning device of claim 1, wherein the conformable structure includes resilient flowable pellets.

5. The patient proning device of claim 1, wherein the conformable structure includes a bag filled with expandable polystyrene foam pellets.

6. The patient proning device of claim 1, wherein the conformable structure includes one or more removable and replaceable pads.

7. The patient proning device of claim 1, wherein the conformable structure includes one or more tensioning belts configured to apply radial tension about the conformable structure.

8. The patient proning device of claim 1, further comprising a plurality of restraints arranged to secure the human body within the conformable structure.

9. The patient proning device of claim 1, further comprising one or more restraints positioned to secure one or more of a wrist, an ankle, an arm, and a torso of the human body to the conformable structure.

10. The patient proning device of claim 1, further comprising one or more guide loops coupled to the conformable structure to secure cords or tubes of medical devices coupled to the human body.

11. The patient proning device of claim 1, further comprising a plurality of pull elements arranged about an exterior of the conformable structure, the plurality of pull elements shaped, sized, and positioned to facilitate manual rotation of the patient proning device about the axis.

12. The patient proning device of claim 1 further comprising one or more handles on the conformable structure to facilitate rotating the human body between prone and supine positions.

13. A system comprising:

a patient proning device including:

a conformable structure shaped and sized to enclose a front and back of a human body while exposing at least a head of the human body along an axis of the conformable structure aligned to the human body when the human body is placed within the conformable structure, wherein the conformable structure includes one or more inflatable chambers, and wherein the conformable structure includes one or more non-stretchable panels on a first exterior surface of the one or more inflatable chambers to impart a cross sectional portion of a circle or ellipse to the conformable structure along the axis of the conformable structure aligned to the human body upon inflation of the one or more inflatable chambers;

a bedding surface for the patient proning device, the bedding surface including raised edges to resist translation of the patient proning device relative to the bedding surface during rotation of the patient proning device; and a low-friction interface between the first exterior surface of the one or more inflatable chambers of the patient proning device and the bedding surface, the low-friction interface including a closed loop of a deformable sheet material disposed between the patient proning device and the bedding surface, an interior surface of the closed loop of the deformable sheet material having a self-coefficient of friction for internal contact, wherein a second exterior surface of the closed loop of the deformable sheet material has a coefficient of friction with the patient proning device and the bedding surface greater than the self-coefficient of friction for the internal contact.

14. The system of claim 13, further comprising a pressurized fluid source coupled to the one or more inflatable chambers and operable to controllably inflate the one or more inflatable chambers.

15. The system of claim 13, further comprising a plurality of restraints arranged to secure the human body within the conformable structure.

16. The system of claim 13, further comprising a plurality of pull elements arranged about the first exterior surface of the one or more inflatable chambers of the conformable structure, the plurality of pull elements shaped, sized, and positioned to facilitate rotation of the conformable structure about the axis.

17. The system of claim 13, further comprising one or more releasably securable fasteners to hold the conformable structure in a wrapped position around the human body.

18. The system of claim 13, further comprising one or more mating hook and loop surfaces on the conformable structure to hold the conformable structure in a wrapped position around the human body.

19. The system of claim 13, further comprising one or more restraints positioned to secure one or more of a wrist, an ankle, an arm, and a torso of the human body to the conformable structure.

20. The system of claim 13, further comprising one or more handles on the conformable structure to facilitate rotating the human body between prone and supine positions while within the conformable structure.

* * * * *